US006879451B1

(12) United States Patent
Hewlett et al.

(10) Patent No.: US 6,879,451 B1
(45) Date of Patent: Apr. 12, 2005

(54) NEUTRAL DENSITY COLOR FILTERS

(75) Inventors: Gregory J. Hewlett, Richardson, TX (US); Steven M. Penn, Plano, TX (US); Greg S. Pettitt, Rowlett, TX (US); Dana F. Segler, Jr., Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/753,838

(22) Filed: Jan. 7, 2004

(51) Int. Cl.[7] .................................................. G02B 5/22
(52) U.S. Cl. ........................ 359/891; 359/885; 359/888; 348/743; 356/418; 362/293
(58) Field of Search ..................... 359/885, 888, 359/891; 345/589; 348/743; 356/418; 362/293

(56) References Cited

U.S. PATENT DOCUMENTS

| 5,587,786 A | 12/1996 | Champagne et al. |
| 5,606,457 A | 2/1997 | Chiu et al. |
| 5,608,213 A | 3/1997 | Pinkus et al. |
| 5,812,303 A | * 9/1998 | Hewlett et al. ............. 359/298 |
| 6,309,070 B1 | * 10/2001 | Svetliza et al. ............. 351/221 |
| 2004/0080721 A1 | * 4/2004 | Lassar et al. ................. 353/84 |
| 2004/0201828 A1 | * 10/2004 | Wang .......................... 353/84 |

* cited by examiner

Primary Examiner—Leo Boutsikaris
(74) Attorney, Agent, or Firm—Charles A. Brill; Wade James Brady, III; Frederick J. Telecky, Jr.

(57) ABSTRACT

The present application describes embodiments of a neutral density color wheel filter. According to one embodiment, a neutral density color wheel (100) includes an opaque coating (135) over one or more color segments (120, 130, 140, 150, 160, 170) with randomly placed transmissive regions (131). The transmissive regions (131) can be configured to substantially transmit incident light and the opaque coating (135) can be configured to substantially block or absorb the incident light. Alternatively, the transmissive regions (131) can be configured to substantially transmit the incident light. The color segments with opaque coating (135) and transmissive regions (131) substantially eliminate light recycling due to the reflection from the color wheel. The light transmission from the color wheel (100) is independent of the optics of a display system.

40 Claims, 2 Drawing Sheets

NEUTRAL DENSITY COLOR FILTERS

TECHNICAL FIELD

The present application describes neutral density color wheel filters for video display systems, and specific embodiments of a neutral density color wheel filter.

BACKGROUND

Generally, neutral density color wheel filters are used to provide more bits for data processing within a color segment time of the color wheel. Typically, a lower density color segment is included in the color wheel to extend the time required to process the least significant bit of a corresponding data sample. One such color wheel design is described by Hewlett et al. U.S. Pat. No. 5,812,303, disclosure of which is incorporated herein by reference in its entirety for all purposes. Typically, the neutral density color wheels are designed using a dielectric coating (e.g., Magnesium, Fluoride, and Aluminum) on the color wheel. The transmissivity of the dielectric coating is adjusted according to a given application.

When light from a light source is incident upon conventional color wheel along an optical path, the dielectric coating of the color wheel partially reflects the incident light back into the optical path. The reflected light is then recycled back from the light source and incidents upon the color wheel for the second time. This recycling of light between the color wheel and the light source increases the effective light transmission through the color wheel filter and detrimentally affects the color properties of a display system. The light transmission through the color wheel becomes dependent upon the system optics and the effective light transmission of the system cannot be accurately determined.

SUMMARY

The present application describes embodiments of a neutral density color wheel filter. According to one embodiment, a non-reflective neutral density color wheel can be configured to substantially eliminate recycling of light between the color wheel and a light source. In some embodiments, the neutral density color wheel includes an opaque coating over one or more color segments (e.g., full color segments or neutral density color segments) with randomly placed transmissive regions. The transmissive regions can be configured to substantially transmit incident light and the opaque coating can be configured to substantially block or absorb the incident light. Alternatively, the transmissive regions can be configured to substantially block or absorb the incident light and the opaque coating can be configured to substantially transmit the incident light. The size and spacing of the transmissive regions within a particular color segment can be used to determine the effective light transmission of that particular color segment. The ratio of the area of the transmissive regions versus the area of the opaque surface can be adjusted according to a transmission rate required by a given application. The color segment with opaque coating and transmissive regions substantially eliminates light recycling due to the reflection from the color wheel. The light transmission from the color wheel is independent of the optics of a display system. This results in an increased transmission stability of the display system.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE EMBODIMENTS

Figure 1:
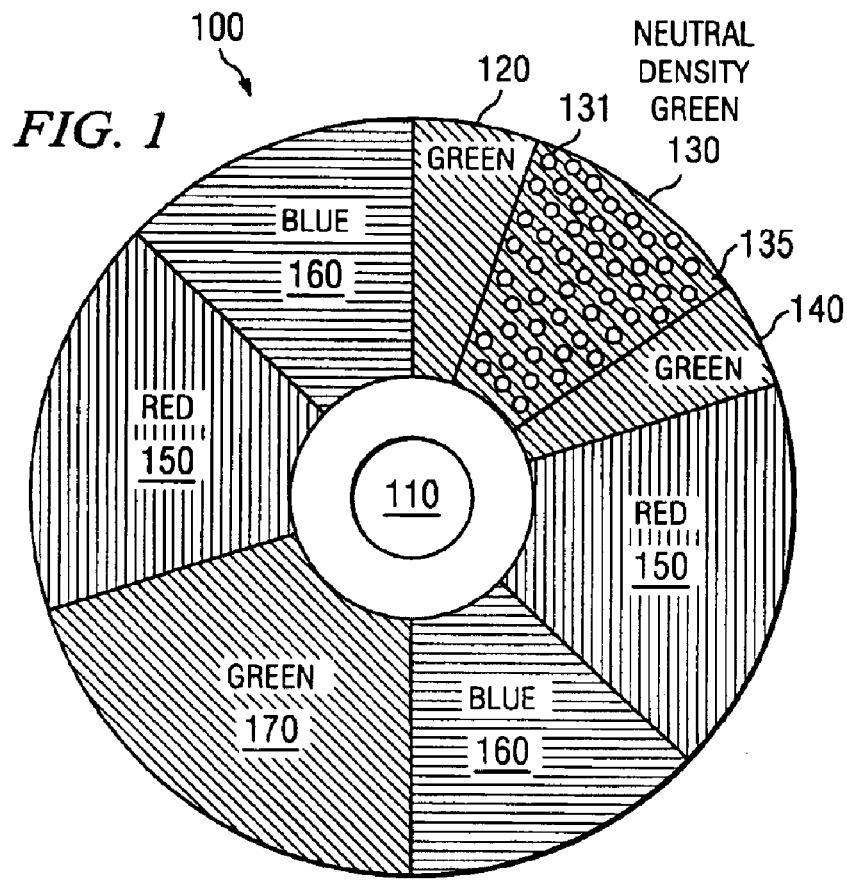
FIG. 1 illustrates an exemplary neutral density color wheel.

FIG. 1 illustrates an exemplary neutral density color wheel 100. The color wheel 100 includes a mounting 110 for a motor (not shown). The color wheel 100 further includes three green segments 120, 140, and 170, two red segments 150, and two blue segments 160. The color wheel 100 further includes a neutral density ("ND") green segment 130, which is sandwiched between two green segments 120 and 140. For purposes of illustrations, one neutral density color segment is shown; however, one or more neutral density color segments can be included in any color segment. For example, one or more neutral density color segments can be included in each of the red, blue, and green color segments. Alternatively, one or more neutral density color segments can be placed between each color segment. Further, neutral density color segments can be placed anywhere within or adjacent to any color segment on the color wheel 100. The number, size, and placement of color segments on the color wheel 100 can be determined according to the transmission requirements of a given application.

The ND green segment 130 includes a patterned coating 135. In the present example, the coating 135 is configured as opaque, non-reflective, and substantially blocks/absorbs incident light; and the transmissive regions 131 are configured to transmit light. In some embodiment, the transmissive regions 131 can be configured to substantially block/absorb light and the coating 135 can be configured to transmit light. The coating 135 can be configured using deposited chrome, silicon dioxide ($SiO_2$), silicon nitride, amorphous silicon, or similar material. The coating 135 can be deposited on the color wheel 100 using a photo mask to generate a pattern including transmissive regions 131. The coating 135 can be deposited on the color wheel 100 using various processes such as, spin-on glass deposition, chemical vapor deposition, physical vapor deposition, ion beam deposition, glass frit deposition, and similar other methods. In the present example, the transmissive regions 131 are shown as circular regions; however, the transmissive regions 131 can be configured using any appropriate shape.

The number, size, and placement of the transmissive regions 131 in a particular color segment can depend upon the amount of light transmission required through the particular color segment. For example, in a typical application, the cumulative area of the transmissive regions 131 can be in the range of about 6% to 12% of the overall surface area of a given color segment to provide at least 95% transmission throughput. The size and placement of the transmissive regions 131 can be adjusted to substantially eliminate light diffraction. According to one embodiment, the diameter of a circular transmissive region 131 can be as small as about 0.10 mm without causing any diffraction effect.

When light is incident upon the ND green segment 130, the portion of the light that is incident upon the transmissive regions 131 is transmitted through the color wheel and the portion of the light that is incident upon the opaque coating 131 is substantially blocked/absorbed by the coating 131. The coating 131 does not reflect the incident light thus, the light transmission through the color wheel 100 does not depend upon the optics of a system that includes the color wheel 100.

Figure 2:
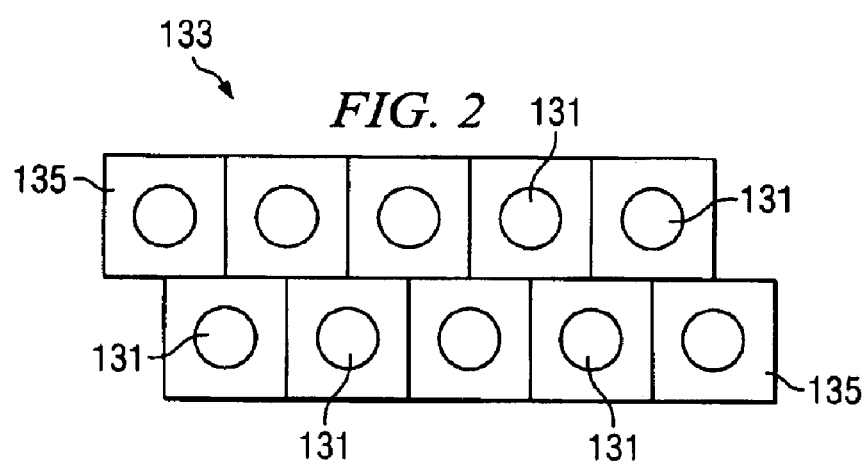
FIG. 2 illustrates an exemplary pattern of transmissive regions in a neutral density color segment of a color wheel.

FIG. 2 shows an exemplary pattern 133 for the ND green segment 130 on the color wheel 100. The exemplary pattern 133 includes transmissive regions 131 that are substantially enclosed by the layer 135. The exemplary pattern 133 is configured to transmit light-without diffraction. In the exemplary pattern 133, transmissive regions 131 are configured to substantially transmit incident light and the layer 135 is configured to substantially block/absorb the incident light; however, the transmissive region 131 can be configured to substantially block/absorb the incident light and the layer 135 can be configured to substantially transmit light. In the exemplary pattern 133 for ND green segment 130, two rows of transmissive regions 131 are shown; however, the number of transmissive regions 131 in a given segment can depend upon the size of the given segment. Further, the transmissive regions 131 can be placed in any random, fixed, or equal step pattern to provide a desired amount of light transmission through the neutral density green segment 130.

Figure 3:
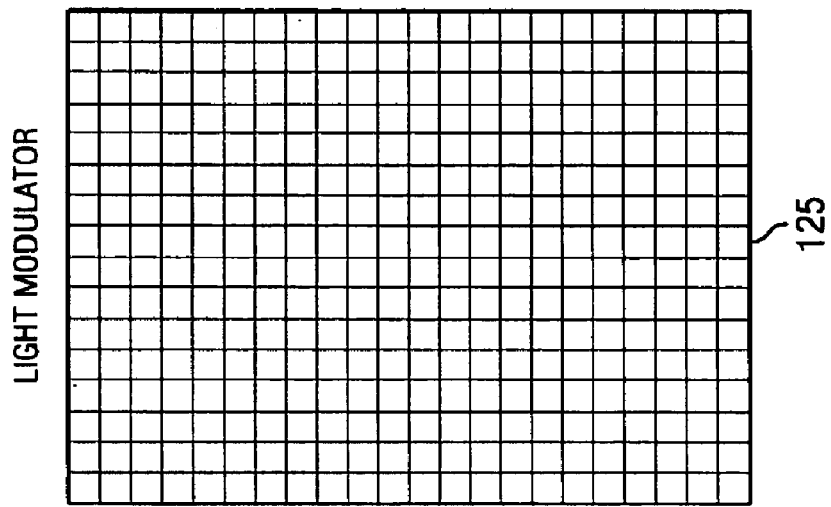
FIG. 3 illustrates an exemplary video display system, which includes the exemplary neutral density color wheel with transmissive regions.
Figure 3:
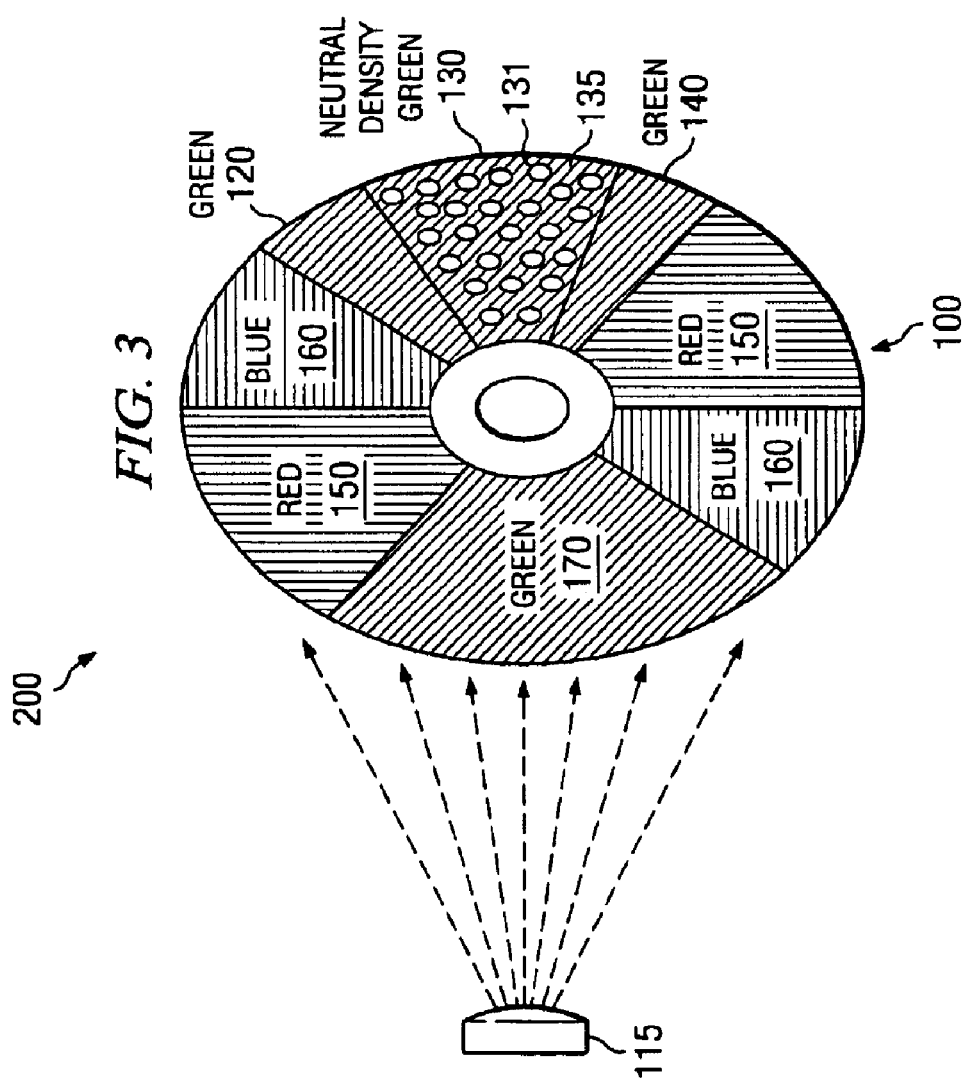

FIG. 3 illustrates an exemplary video display system 200 including the exemplary neutral density color wheel 100. The system 200 includes a light source 115, the neutral density color wheel 100, and a light modulator 125. The light modulator 125 can be any modulator configured to create images such as, a spatial light modulator. When light from the light source 115 is incident upon the ND green segment 130, the portion of the light that impinges upon the transmissive regions 131 transmits through the neutral density color wheel 100. The portion of the light that impinges upon the coating 135 is substantially absorbed by the coating 135. Thus, there is substantially no reflection or recycling of the incident light in the system 200.

The techniques described herein can be modified to substantially eliminate recycling of light between a light source and a color wheel. For example, in one embodiment, the color segments on the color wheel can be configured using an absorptive coating. The absorptive coating can transmit through a desired amount of light and absorb the rest. In some embodiments, the color wheel in an optical system can be oriented such that the reflected light can be dumped outside the optical system. For example, the orientation of the color wheel can be tilted (e.g., about 5°–200), which can direct the reflected light outside the optical path of the incident light thus, substantially eliminating the recycling of the reflected light.

A few preferred embodiments have been described in detail herein. It is to be understood that the scope of the invention also comprehends embodiments different from those described, yet within the scope of the claims. Words of inclusion are to be interpreted as nonexhaustive in considering the scope of the invention. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically and by way of example, although the headings refer to a "Field of the Invention," the claims should not be limited by the language chosen under this heading to describe the so-called field of the invention. Further, a description of a technology in the "Description of Related Art" is not be construed as an admission that technology is prior art to the present application. Neither is the "Summary of the Invention" to be considered as a characterization of the invention(s) set forth in the claims to this application. Further, the reference in these headings to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the headings included in this application.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, additions, and improvements may fall within the scope of the invention as defined in the claims that follow.

What is claimed is:

1. A color wheel filter comprising:
    at least two color segments configured to transmit light of corresponding colors; and
    at least one other color segment configured to transmit light of substantially the same color as one of the at least two color segments and further comprising first and second pluralities of transmissive regions, wherein each region of the first plurality of transmissive regions substantially has a first transmissivity and each region of the second plurality of transmissive regions substantially has a transmissivity different from said first transmissivity.

2. A color wheel filter according to claim 1, wherein a material is deposited and patterned to remain only in either the first plurality of transmissive regions or the second plurality of transmissive regions.

3. A color wheel filter according to claim 2, wherein the material is a semiconductor processing material.

4. A color wheel filter according to claim 3, wherein the semiconductor processing material selected from the group consisting of: silicon dioxide; silicon nitride; and amorphous silicon.

5. A color wheel filter according to claim 3, wherein the semiconductor processing material is a dielectric.

6. A color wheel filter according to claim 3, wherein the semiconductor processing material is deposited by a method selected from the group consisting of: spin-on glass deposition; chemical vapor deposition; physical vapor deposition; ion beam deposition; and glass frit deposition.

7. A color wheel filter according to claim 2, wherein the material is configured to substantially absorb incident light.

8. A color wheel filter according to claim 2, wherein the material is silicon dioxide.

9. A color wheel filter according to claim 2, wherein the material is chrome.

10. A color wheel filter according to claim 1, wherein the at least one other color segment is adjacent to at least one of the at least two color segments having substantially same color as the at least one other color segment.

11. A color wheel filter according to claim 1, wherein the at least one other color segment is included in at least one of the least two color segments having substantially same color as the at least one other color segment.

12. A color wheel filter according to claim 1, wherein the first and second pluralities of transmissive regions are randomly shaped regions.

13. A color wheel filter according to claim 1, wherein one of the first and second pluralities of transmissive regions includes circularly shaped transmissive regions having a diameter of at least about 0.1 millimeter.

14. A color wheel filter according to claim 13, wherein a cumulative area of the one of the first and second pluralities of transmissive regions that includes circularly shaped transmissive regions, is in the range of about 6% to 12% of an area of the at least one other color segment.

15. A video display system comprising:
a light source;
a light modulator, and
a color wheel filter coupled between the light source and the light modulator, wherein the color wheel filter comprises:
at least two color segments configured to transmit light of corresponding colors; and
at least one other color segment configured to transmit light of substantially the same color as one of the at least two color segments and further comprising first and second pluralities of transmissive regions, wherein each region of the first plurality of transmissive regions substantially has a first transmissivity and each region of the second plurality of transmissive regions substantially has a transmissivity different from said first transmissivity.

16. A video display system according to claim 15, wherein a material is deposited and patterned to remain only in either the first plurality of transmissive regions or the second plurality of transmissive regions.

17. A video display system according to claim 16, wherein the material is a semiconductor processing material.

18. A video display system according to claim 17, wherein the semiconductor processing material is a material selected from the group consisting of: silicon dioxide; silicon nitride; and amorphous silicon.

19. A video display system according to claim 17, wherein the semiconductor processing material is a dielectric.

20. A video display system according to claim 17, wherein the semiconductor processing material is deposited by a method selected from the group consisting of: spin-on glass deposition; chemical vapor deposition; physical vapor deposition; ion beam deposition; and glass frit deposition.

21. A video display system according to claim 17, wherein the material is configured to substantially absorb incident light.

22. A video display system according to claim 17, wherein the material is silicon dioxide coating.

23. A video display according to claim 17, wherein the material is a deposited chrome coating.

24. A video display system according to claim 15, wherein the at least one other color segment is adjacent to at least one of the at least two color segments having substantially same color as the at least one other color segment.

25. A video display system according to claim 15, wherein the at least one other color segment is included in at least one of the at least two color segments having substantially same color as the at least one other color segment.

26. A video display system according to claim 15, wherein the first and second pluralities of transmissive regions are randomly shaped regions.

27. A video display system according to claim 15, wherein one of the first and second pluralities of transmissive regions includes circularly shaped regions having a diameter of at least about 0.1 millimeter.

28. A video display system according to claim 27, wherein a cumulative area of the one of the first and second pluralities of transmissive regions that includes circularly shaped regions, is in the range of about 6% to 12% of an area of the at least one other color segment.

29. A color filter comprising:
a first segment configured to transmit light of a first color;
a second segment configured to transmit light of a second color;
a third segment configured to transmit light of substantially said first color, comprising first and second pluralities of regions formed in said third segment, each region of said first plurality of regions substantially has a first transmissivity and each region of said second plurality of regions substantially has a transmissivity different from said first transmissivity.

30. A color filter according to claim 29, wherein a material is deposited in said first plurality or said second plurality of regions.

31. A color filter according to claim 29, wherein a material selected from the group consisting of: silicon dioxide; silicon nitride; and amorphous silicon is deposited in said first plurality or said second plurality of regions.

32. A color filter according to claim 29, wherein a dielectric is deposited in said first plurality or said second plurality of regions.

33. A color filter according to claim 29, wherein a material is deposited in said first plurality or said second plurality of regions by a method selected from the group consisting of: spin-on glass deposition; chemical vapor deposition; physical vapor deposition; ion beam deposition; and glass frit deposition.

34. A color filter according to claim 29, wherein a material is deposited in said first plurality or said second plurality of regions to substantially absorb incident light.

35. A color filter according to claim 29, wherein silicon dioxide is deposited in said first plurality or said second plurality of regions.

36. A color filter according to claim 29, wherein chrome coating is deposited in said first plurality or said second plurality of regions.

37. A color filter according to claim 29, wherein said third segment abuts at least two segments having substantially the same color as said third segment.

38. A color filter according to claim 29, wherein said first and second pluralities of regions are randomly shaped.

39. A color filter according to claim 29, wherein said first plurality of regions includes circularly shaped regions having a diameter of at least about 0.1 millimeter.

40. A color filter according to claim 39, wherein a cumulative area of said first plurality of regions that includes circularly shaped transmissive regions, is in the range of about 6% to 12% of an area of the at least one other color segment.

* * * * *